Jan. 6, 1942. R. A. STEEL 2,268,725

VALVE

Filed May 8, 1939

INVENTOR
Robert A. Steel
BY
Geo. L. Parkhurst
ATTORNEY

Patented Jan. 6, 1942

2,268,725

UNITED STATES PATENT OFFICE 2,268,725

VALVE

Robert A. Steel, Whiting, Ind., assignor to Standard Oil Company, Chicago, Ill., a corporation of Indiana Application May 8, 1939, Serial No. 272,368

3 Claims. (Cl. 221—106)

This invention relates to an improved valve and more particularly to an improved valve for the transfer of solid material from one location to another.

In the present commercial practice it has become necessary more and more frequently to transfer solid granular material from one location to another in regular amounts or under such conditions that only a definite amount of the solid granular material is transferred at one time. This is particularly true in those locations where a catalytic material of a solid granular nature is used for the conversion of hydrocarbons, as, for example, in such processes as catalytic cracking, catalytic dehydrogenation, catalytic reforming, catalytic polymerization, etc. It has been found that in carrying out these processes various amounts of carbon are deposited on the catalyst thereby obscuring its catalytic effect. The catalyst can be regenerated but it is necessary either to remove the catalyst from the zone of operation or to cease operation and regenerate the catalyst in its original bed. It is usually uneconomical to interrupt the operations and regenerate so that the present tendency is to use a moving catalyst bed whereby the catalyst is removed from the process as it becomes spent and regenerated outside of the unit. Regenerated catalyst is then returned to the operation restored in activity.

It is necessary in removing the catalyst from the zone of operation that the reacting gases be retained within the catalyst chamber. It is also necessary that there be no attrition of the catalyst by grinding or pulverizing as it is removed, since it has been shown in many instances that catalyst size may have a decided effect on the efficiency of the operation.

It is an object of my invention to provide a valve which is effective for continuously removing solid granular material from a reaction zone without deterioration of the material through attrition. It is another object of my invention to provide a valve which will limit the escape of gaseous material from a chamber during the removal of the solid granular material. A still further object of my invention is to provide a valve simple in design, economical to construct and efficient in operation. Further objects of my invention will be apparent from the following description read in conjunction with the accompanying drawing in which:

Figure 1:
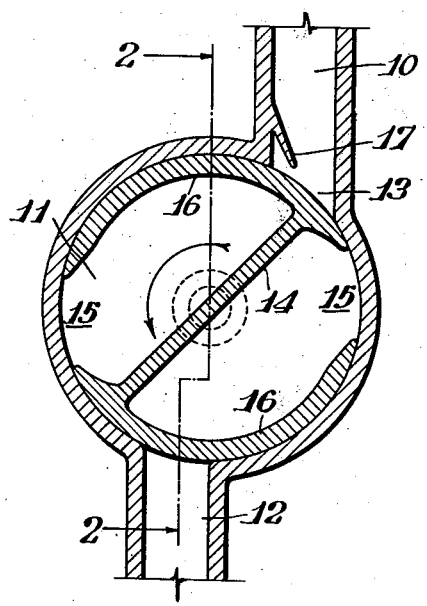
Figure 1 is a sectional elevation of a preferred embodiment of my invention.
Figure 2:
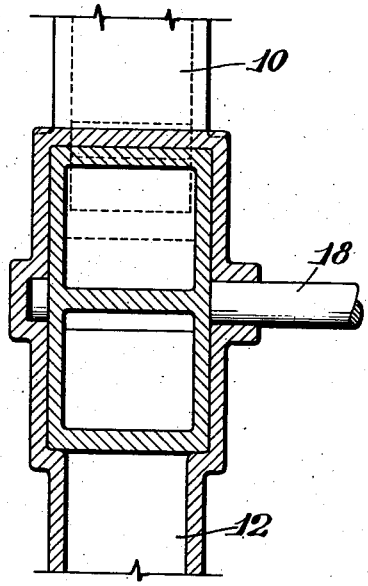
Figure 2 is an elevation taken along the lines 2—2 of Figure 1.

Referring now more particularly to Figures 1 and 2, an inlet passage 10 leads from a chamber containing solid granular material into valve body 11. An outlet passage 12 leads from valve body 11 to a receiving vessel or regenerating system. Passages 10 and 12 are not only off-set from the center of valve body 11 but are preferably off-set from each other, the passage 10 being to one side and above the center of the valve body, while passage 12 is to the opposite side and below the valve body. Moreover it is preferable that the passageways be perpendicular, and also parallel with each other. In this manner, the solid granular material has a free passageway into and from valve body 11, and the danger of "packing" of the solid material in the passageways is eliminated to a marked degree. In addition, means to aid the movement of the solid material, such as screw conveyors, plungers, moving belts, etc., may be omitted, since the weight of the material itself will cause it to drop freely through the perpendicular passageways.

I prefer that the inlet passage 10 be offset from the center in the direction opposite to that in which the rotor 13 rotates. In other words, if the rotor 13 turns in a counter-clockwise direction, the inlet passage should be offset to the right of the center axis of the rotor 13. Within valve body 11 is located rotor 13 which as illustrated is divided by a center wall 14 which forms two chambers. In place of two chambers, however, I may have three or four or even more chambers, the walls defining the chambers in rotor 13 meeting or intersecting at a common central point, and this is contemplated within the scope of my invention. Each chamber has an opening 15, this opening being located in juxtaposition to the center wall 14. The outer walls 16 of rotor 13 which define the opening 15 are beveled. The rotor is turned by rotation of axle 18 (Figure 2), the rotation being supplied by means not shown. A baffle 17 is located in inlet passage 10 just above the opening defined by the juncture of inlet passage 10 and valve body 11, and this forms an important part of my invention. Baffle 17 projects diagonally across the inlet passage 10 from a point on the wall towards which the rotor 13 rotates to a point approximately centrally located in inlet passage 10. The edge of baffle 17 is preferably beveled.

Figure 3:
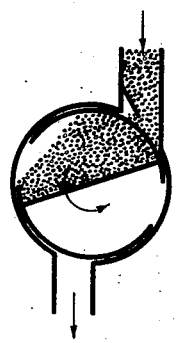
Figures 3, 4, 5 and 6 illustrate the various positions of my valve in operation.
Figure 4:
Figure 5:
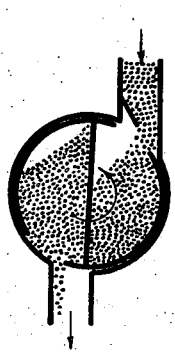
Figure 6:
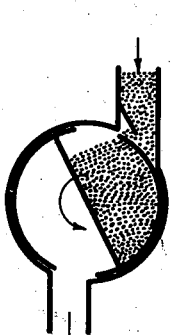

Referring now to Figures 3, 4, 5 and 6 the operation of my valve in transferring solid granular material from a chamber may be noted. In Figure 3 the chamber has been filled with catalyst and the rotation has proceeded to a point where inlet passage 10 and outlet passage 12 are closed by the wall 16 of rotor 13. In Figure 4 the opening 15 in the unfilled chamber of the valve is in partial alignment with the opening from inlet passage 10 into valve body 11 and the solid granular material is falling into the unfilled chamber. Baffle 17 aids in deflecting the solid material into the opening and away from the opposite edge of inlet passage 10. In Figure 5 the entire opening 15 of the unfilled chamber has coincided with the opening defined by the entrance inlet passage 10 into the valve body 11 and the solid material has almost entirely filled the chamber. Any material caught back of baffle 17 has also fallen into the chamber. On the opposite side the solid material from the previously filled chamber is being discharged into passage 12 as opening 15 in that chamber comes into alignment with passage 12. In Figure 6 the solid material has been almost completely discharged from the previously filled chamber while the opposite chamber has been almost completely filled with catalyst from inlet passage 10 and the rotor walls 16 are again forming a seal between the inlet passage 10 and the valve body 11.

It will be seen from the above that at no time is there a direct passage from inlet passage 10 to outlet passage 12 so that only such material other than the solid granular material as can be encompassed in the receiving chamber is removed from the chamber above. In other words, there is no possibility for the escape of gases or any great amount of liquid through inlet passage 10 and through the valve.

The edge of baffle 17 should be slightly above the advancing edges of the rotor chamber in order to minimize crushing of the solid material between these edges and the distance will ordinarily be several times, for instance three times, the average or maximum diameter of the solid particles passing through the valve. The edge of the baffle 17 is also beveled. The outer edges of rotor walls 16 fit tightly against the inner wall of valve body 11 so that the space between the two is less than the particle size of the solid material. The baffle 17 is so placed that it prevents the feeding of the solid granular material to the rotor chamber as the beveled edges defining opening 15 in rotor 13 approach the juncture of the far edge of passage 10 and valve body 11. Moreover, the catalyst passing under baffle 17 is removed when the opening 15 in rotor 13 reaches the space under this baffle, and thus the space in question is self-cleaning. In this way the crushing or pulverization of the solid material between the walls of the valve body 11 and the rotor 13 by being forced into the valve body is reduced as far as is practical. The beveled edges defining the opening 15 also aid in directing the solid material into the valve chamber without attrition of the material itself.

I have illustrated my invention as comprising a cylindrical valve body and rotor but it should be understood that this may also be of various other shapes with equal effectiveness. It may be, for example, spherical, frustro-conical, ellipsoidal, ovoidal, etc. The rate of rotation of the valve can be controlled so that the amount of solid material removed in a given unit of time can be regulated. It should also be obvious that this valve is equally effective in delivering a solid granular material to a reaction chamber in controlled amounts, in which event, outlet passage 12 will be connected with a reaction chamber, preferably at its upper end. It may be preferable, in fact, to admit and remove solid granular material from a chamber by similar valves at the inlet and exit ends which are so regulated that the removal of a certain amount of material automatically causes a similar amount of solid material to be added to the reaction chamber.

By my design it is possible to remove a solid material from a chamber or deliver it to a chamber, or both, without degradation of the material and without the loss of extraneous material except such as may be carried with the material into the valve. My valve is of simple construction and free from delicate parts which may cause trouble.

I claim:

1. A valve for transferring solid granular material comprising a valve body having an inlet passage and an outlet passage, said passages being offset to each other and to the center of said valve body, a rotor within said valve body, said rotor having an outer wall and at least one center wall defining at least two hollow chambers, means defining an opening in each of said chambers adapted to communicate with said passages in said valve body, a baffle in said inlet passage extending diagonally downward from the wall of said inlet passage to a point approximately centrally located within said inlet passage, and spaced from the top of said rotor by a distance which is a small multiple of the particle size of said solid granulated material.

2. A valve for transferring solid granular material comprising a valve body having an inlet passage and an outlet passage, said passages being offset to each other and to the center of said valve body, a rotor within said valve body, said rotor having an outer wall and at least one center wall defining at least two hollow chambers, means defining an opening in each of said chambers adapted to communicate with said passages in said valve body, a baffle in said inlet passage extending diagonally downward from the wall of said inlet passage to a point approximately centrally located within said inlet passage, and spaced from the top of said rotor by a distance which is a small multiple of the particle size of said solid granulated material, and rotating means for causing said rotor to turn and openings in the said chamber to communicate with said passages in said valve body defined by said means.

3. In a valve of the type adapted to control the flow of solid granulated material while substantially preventing free fluid flow, said valve comprising a valve body, an inlet passage and an outlet passage associated with said valve body, a rotor within said valve body, said rotor having an outer wall and at least one internal wall defining at least two hollow chambers, means defining an opening in each of said chambers adapted to communicate with said inlet and outlet passages and rotating means causing said rotor to turn and the openings in the said chambers to communicate with said inlet and outlet passages, the improvement which comprises a baffle in said inlet passage projecting diagonally across said inlet passage from a point on the wall of said inlet passage towards which said rotor rotates to a point approximately centrally located within said inlet passage and spaced from the top of said rotor by a distance which is a small multiple of the particle size of the material passing through said valve, said baffle defining a self-cleaning chamber above said rotor on the side of said inlet passage towards which said rotor rotates.

ROBERT A. STEEL.